US005984292A

United States Patent [19]
Troha

[11] Patent Number: 5,984,292

[45] Date of Patent: Nov. 16, 1999

[54] ADJUSTABLE CLAMPING DEVICE

[76] Inventor: Louis J. Troha, 23501 Geneva, Oak Park, Mich. 48237

[21] Appl. No.: 08/980,249

[22] Filed: Nov. 28, 1997

[51] Int. Cl.[6] ........ B23Q 3/02

[52] U.S. Cl. ........ 269/91; 269/93; 269/95

[58] Field of Search ........ 269/95, 134, 269, 269/71, 73, 243, 91–94, 244, 88, 99, 100; 81/173

[56] References Cited

U.S. PATENT DOCUMENTS

| | | | |
|---|---|---|---|
| 1,196,703 | 8/1916 | Kraut . | |
| 1,415,103 | 5/1922 | McQueen | 81/173 |
| 1,913,988 | 6/1933 | Keefe . | |
| 2,351,436 | 6/1944 | Ketz | 269/93 |
| 3,297,314 | 1/1967 | Brown . | |
| 3,623,718 | 11/1971 | Thomeczek, Sr. | 269/91 |
| 3,957,261 | 5/1976 | Hefel . | |
| 4,580,769 | 4/1986 | Pappas | 269/100 |
| 4,854,567 | 8/1989 | Persson et al. | 269/71 |

*Primary Examiner*—David A. Scherbel
*Assistant Examiner*—Lee Wilson
*Attorney, Agent, or Firm*—Charles W. Chandler

[57] ABSTRACT

An adjustable clamping device. A base or a channel is attached to either the top or side of a work table. The base has a threaded aperture for engaging one end of a threaded rod upon which several adjustable clamping bars are positioned. The clamping members are each movable to an adjusted clamping position on the threaded rod.

8 Claims, 2 Drawing Sheets

ADJUSTABLE CLAMPING DEVICE

BACKGROUND OF THE INVENTION

This invention relates to an adjustable device for clamping objects of various heights and thickness.

A clamp is used to hold a workpiece for an operation. A disadvantage of many prior art clamps is that it is difficult to adjust the clamp after it is connected to the workpiece.

It would be convenient to adjust a clamping member by merely adjusting a fine adjustment mechanism. It would also be convenient to have a clamping device that can be used on top of the work surface as well as on the side of the work surface.

Examples of the known art are shown in the following U.S. Pat. Nos.: 1,196,703 to Kraut for a tool; 1,913,988 to Keefe for a shelf bracket; 3,297,314 to Brown for a variable V-block and clamping device or assembly; and 3,957,261 to Hefel for a holding device for workpieces and the like.

The Kraut patent discloses a combination wrench, hammer, scale and clamp. The Keefe patent shows a shelf bracket for gripping a shelf. The Brown patent teaches a V-block having replaceable different diameter eyes and V-plates for holding different workpieces. The Hefel patent shows a device that has clamping arms that are moved axially by loosening nuts. None of these patents show a clamp having an insert partially contained within a cavity of the clamping member and having an adjustment hub extending outside the clamping member.

SUMMARY OF THE INVENTION

It is an object of the invention to provide an adjustable clamping device that can be readily adjusted for various workpiece dimensions.

It is an object of the invention to provide an adjustable clamping device that can be finely adjusted when the clamp is in the clamped position.

It is also an object of the invention to provide an adjustable clamping device that can be readily affixed either to the top of a work surface, to the edge of a work surface, or independently of a work surface.

The preferred embodiment of the invention has several elongated clamping bars threadably mounted on a shaft. Each clamping bar comprises a top plate and a bottom plate that have recesses that create an internal cavity. A threaded insert is placed in the cavity, and has a hub extending beyond the sides of the clamping member. The clamping bar is adjusted axially on the shaft by turning the insert.

Each clamping bar has a variety of clamping surfaces. A workpiece can be clamped between a pair of clamping bars, or between a clamping bar and a work surface. The shaft can be mounted on either the top or side of a work surface, or have its position adjusted along either surface.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 2:
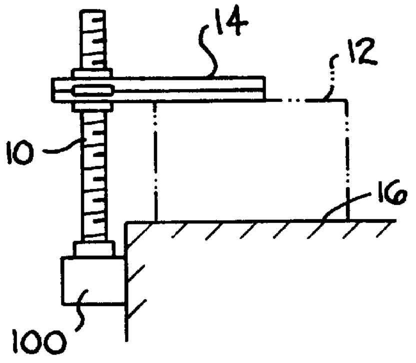
FIG. 2 illustrates the preferred clamping device mounted along the side of the work table.
Figure 3:
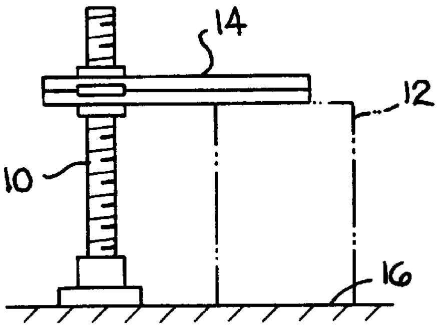
FIG. 3 is a view showing the preferred clamping device mounted on top of the work table.
Figure 4:
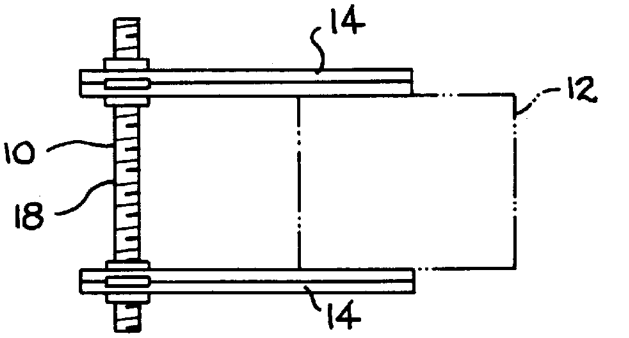
FIG. 4 is a view showing the clamping device being used independently of a work table.

Referring to the drawings, a clamping device generally illustrated at 10 is shown in FIGS. 2–4, employed for clamping a workpiece 12 in position for an industrial operation. Workpiece 12 is shown in phantom.

In FIGS. 2 and 3, the clamping device employs a bar 14 for mounting the workpiece 12 on a work table 16. FIG. 4 shows the preferred clamping device with two identical bars 14 mounted on an elongated threaded rod 18 for supporting the workpiece between the longer ends of the two bars.

Figure 5:
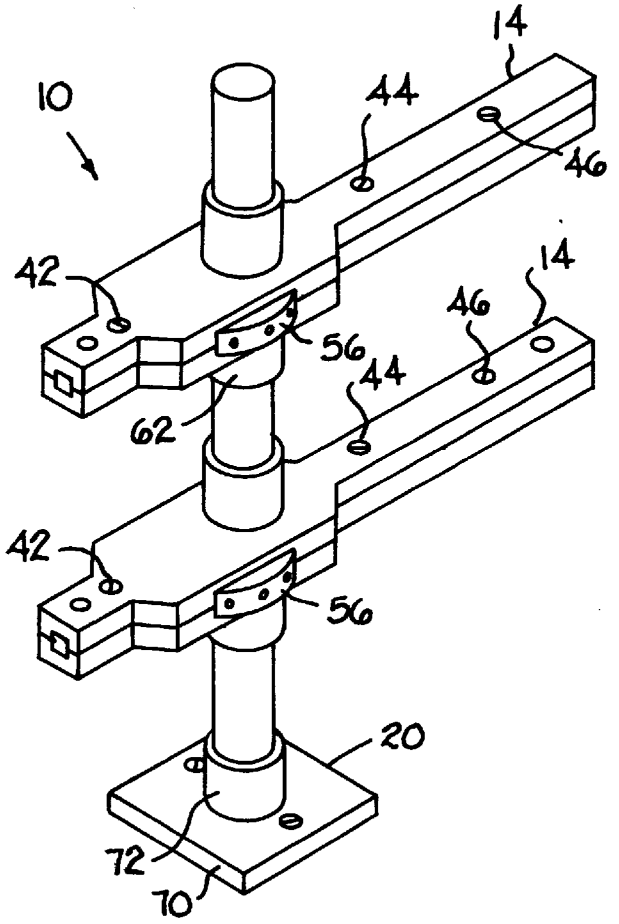
FIG. 5 is a perspective view showing the preferred clamping device mounted on the work table.

Referring to FIG. 5, rod 18, for illustrative purposes, has a length of about 4" with a ⅞" diameter. The length and the particular diameter may be adapted to suit the specific application. One end of the rod is threadably mounted on a base 20.

Figure 6:
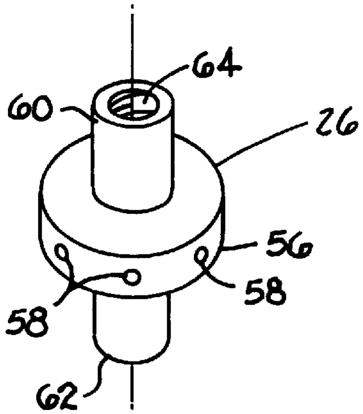
FIG. 6 shows a typical sleeve that is threadably mounted on the threaded rod.
Figure 7:
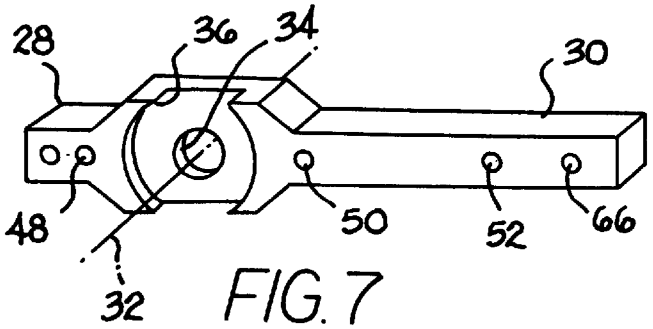
FIGS. 7 and 8 show the two halves of a typical clamping bar.
Figure 8:
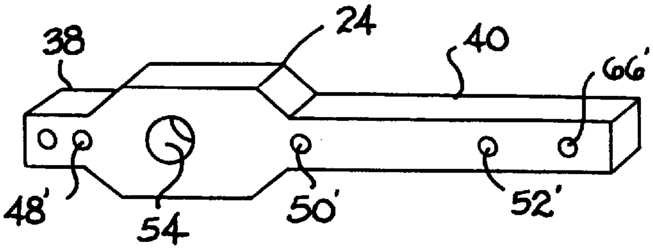

Each clamping bar assembly 14 comprises three other principle components, that is, a threaded insert, an upper bar section 22 as illustrated in FIG. 7, a lower bar section 24 as illustrated in FIG. 8, and an internally threaded insert 26, illustrated in FIG. 6. Bar section 22 has a shorter arm 28 and a longer arm 30. For illustrative purposes, arm 28 may have a length of 1" measured from the axis 32 of a central bore 34, while arm section 30 may have a length of 2" from axis 32. The two bars are thinner than their midsection. A typical bar width is about ½". The overall thickness of the two bar sections may also be ½".

Bore 34 has a diameter slightly larger than the diameter of threaded rod 18.

Bar section 22 also has a generally cylindrical cut-out portion 36 extending from bore 34.

Similarly bar section 24 has a short arm section 38 and a longer arm section 40. The short arm and the long arm have the same length as short arm 28 and long arm 30 of bar section 22 so that they may be combined together as illustrated in FIG. 5. The two bar sections are joined together by threaded fastener means 42, 44 and 46 which are received in aligned openings 48, 50 and 52, and 48', 50', and 52' respectively of the two bar sections.

Openings 48', 50' and 52' are each internally threaded for engaging fasteners 42, 44, and 46. Bar section 24 also has a bore 54 which is aligned with bore 34 for receiving the threaded rod.

The two bars, when joined together, form a cavity for receiving an enlarged cylindrical hub 56 of the threaded insert which extends beyond the side edges of the two bars, as illustrated in FIG. 5. Hub 56 has a series of spaced holes 58 which may be used for adjusting the position of the insert on the threaded rod. The insert also has a pair of cylindrical bosses 60 and 62 which extend in opposite axial directions from hub 56. An internal threaded bore 64 extends through both bosses and the hub and is adapted to be threadably mounted on the threaded rod. The bosses have a length sufficient to extend beyond the top and bottom of the joined clamping bars as illustrated in FIG. 5.

The outer ends of the bars have threaded openings 66 and 66' which are aligned and adapted for connecting a bar (not shown) for connecting the clamping bars together.

The clamping bars are mounted on threaded rod 18, as illustrated in FIG. 5. The clamping bars may be easily adjusted by swinging either bar around the threaded rod. The user can also obtain a fine adjustment of the position of the clamping bar by turning hub 56 to move the clamping bar axially along the threaded rod without turning the clamping bar. Hub 56 can be easily turned with the user's fingers, or by inserting a tool into a hole 58 he can apply a greater pressure for moving the clamping bar.

Although, the preferred embodiment is made of aluminum it can also be made of brass, steel, or plastic components.

Figure 1:
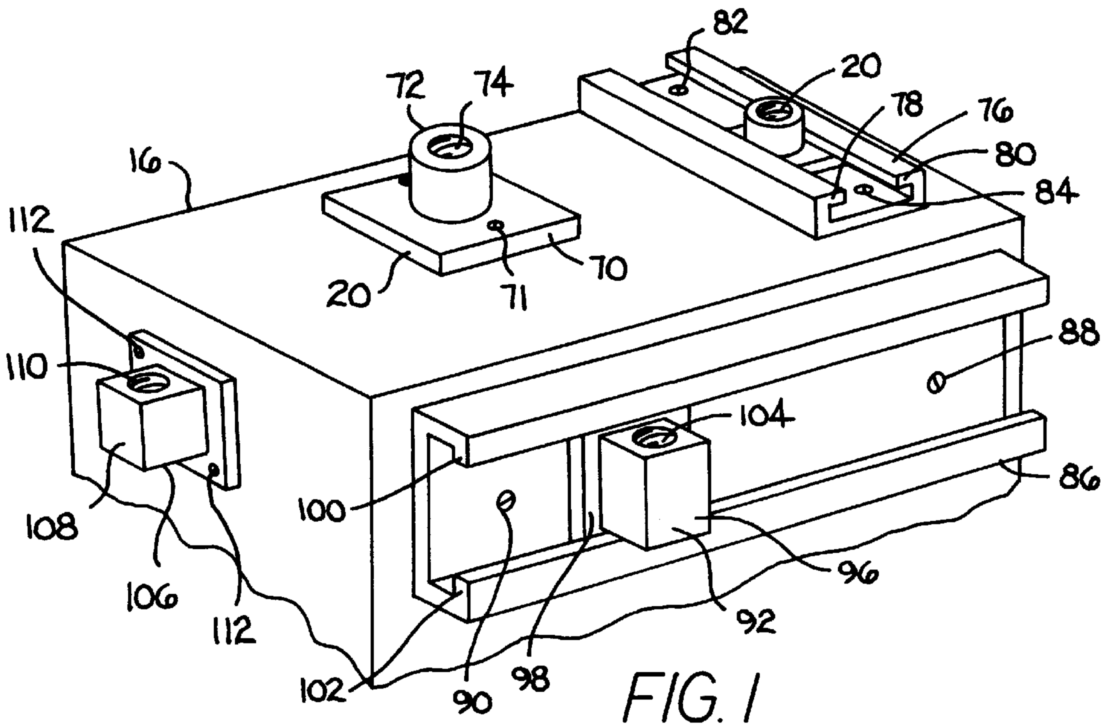
FIG. 1 is a perspective view showing various base members for mounting the preferred clamping device to a work table.

FIG. 1 illustrates several forms by which the preferred clamping assembly can be mounted on a work table. Base 20 has a square plate 70 that may be attached by fastener means 71 to the work table. Sleeve 72 has an internally threaded bore 74, and extends perpendicular to the top surface of a work table. The internally threaded bore is adapted to threadably receive the lower end of threaded rod 18 so that the rod is perpendicular to the top of the workpiece and the clamping bars are parallel to the top work surface. In this position, workpiece 12 can be clamped between a bar 14 and the work table, as illustrated in FIG. 3. In a similar manner, base 20 can be mounted in a channel 76 having a pair of lips 78 and 80 for retaining the opposite side edges of base plate 70. The channel may have any suitable length and is fastened to the work table by fastener means 82 and 84. In this arrangement the horizontal position of the clamping device can be adjusted.

A similar channel 86 can be mounted to the vertical side edge of the work table by fasteners 88 and 90. In this arrangement, base 92 comprises a block 96 attached to a plate 98 which is slidably mounted in the channel between a pair of lips 100 and 102. Block 96 has a threaded bore 104 adapted to threadably receive the lower end of threaded rod 18. In this arrangement, the threaded rod is held in a vertical position for supporting the clamping bars so that they can support the workpiece either between a pair of bars or between a single bar and the top of the work table. The clamping assembly can be adjusted horizontally along the side edge of the work table.

Another base 106 is mounted along the side edge of the work table and includes a block 108 having a threaded bore 110 adapted to threadably receive the lower end of the threaded rod. The base plate is attached to the work table by fastener means 112. In this position, the base provides a stationary location for supporting the clamping assembly in an upright position as illustrated in FIG. 2 for clamping a workpiece between a clamping bar and the work table.

Having described my invention, I claim:

1. An adjustable clamping device for placement on a work surface, the device comprising:

a base member;

fastener means for attaching the base member to the work surface;

a threaded rod attachable to the base member; and at least two elongated clamping bars adjustably mounted on the threaded rod, each of the clamping bars comprising a bottom plate, a top plate attached to the bottom plate, said plates having a recess forming a cavity within the clamping bar, and an insert mounted within the cavity and threadably connected to the threaded rod whereby the insert may be moved along the threaded rod to move the clamping bar along the threaded rod to an adjusted position while the clamping bar is disposed in a clamping position perpendicular to the threaded rod.

2. The device according to claim 1, wherein the insert has a hub extending beyond the side of the clamping bar.

3. The device according to claim 1, wherein the threaded rod has a longitudinal axis and the base member is supported along the axis of the threaded rod.

4. The device according to claim 1, wherein the threaded rod has a longitudinal axis, and the base member is disposed beneath one end of the threaded rod.

5. The device according to claim 1, further comprising a channel attachable to a work area, the base member being slidably moveable along the channel.

6. The device according to claim 5, in which the channel can be attached to either a horizontal or a vertical mounting surface.

7. The device according to claim 1, wherein the insert sleeve has a hub with peripherally spaced adjustment holes.

8. The device according to claim 1, wherein the cavity formed within each of the clamping members is nearer to one end of the clamping member than the other end.

* * * * *